W. E. SHEPARD.
HARROW ATTACHMENT FOR PLOWS.
APPLICATION FILED FEB. 14, 1918.
1,281,676.
Patented Oct. 15, 1918.
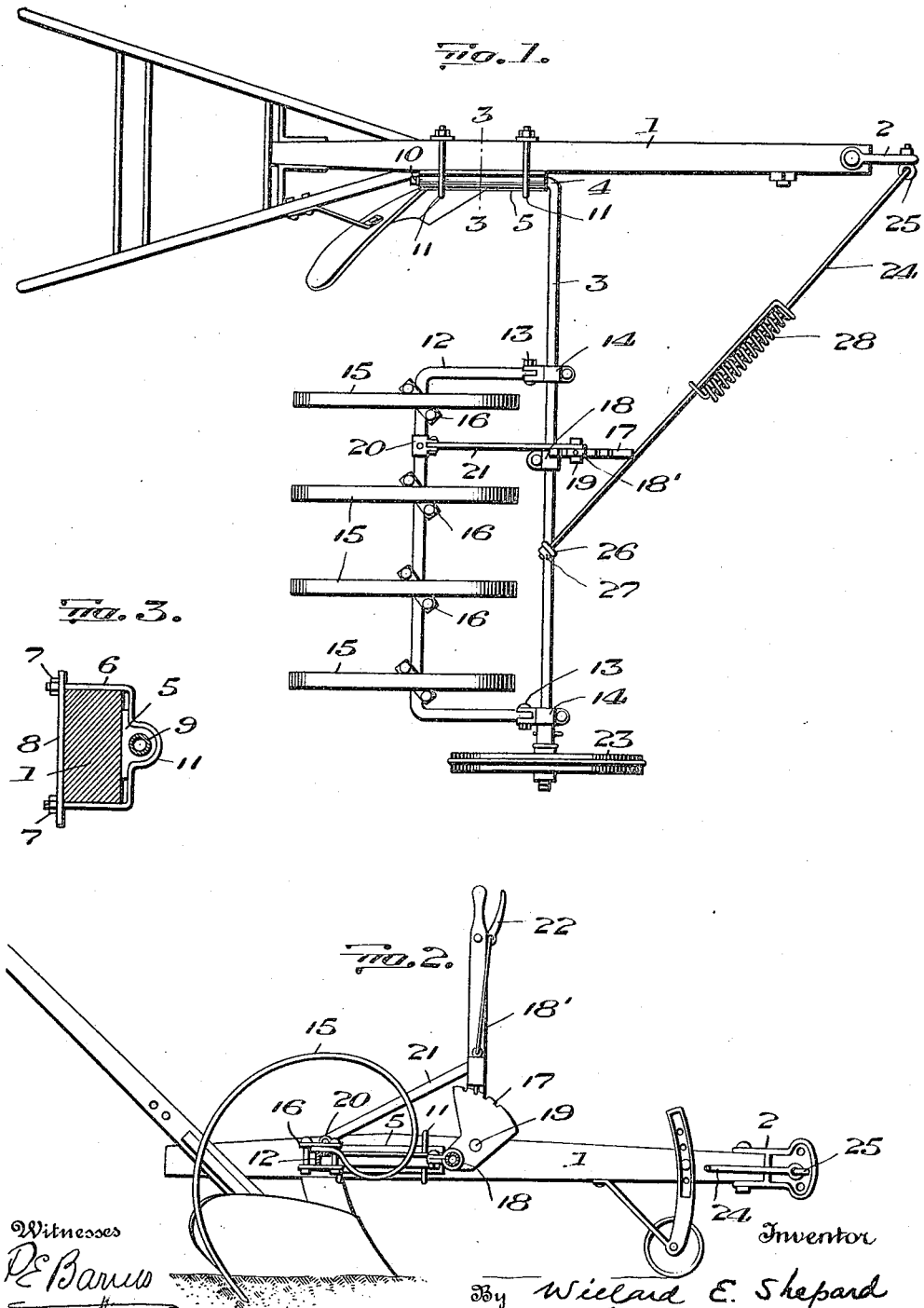

UNITED STATES PATENT OFFICE.

WILLARD E. SHEPARD, OF OROVILLE, WASHINGTON, ASSIGNOR OF ONE-HALF TO GEORGE V. SHEPARD, OF ENUMCLAW, WASHINGTON.

HARROW ATTACHMENT FOR PLOWS.

1,281,676.

Specification of Letters Patent.  Patented Oct. 15, 1918.

Application filed February 14, 1918. Serial No. 217,163.

*To all whom it may concern:*

Be it known that I, WILLARD E. SHEPARD, a citizen of the United States, residing at Oroville, county of Okanogan, State of Washington, have invented certain new and useful Improvements in Harrow Attachments for Plows, of which the following is a specification.

This invention relates to harrow attachments for plows.

My object is to provide a simple, inexpensive, durable and easily applied and removed attachment for plows whereby the ground is harrowed without extra expense, at the time it is plowed.

The invention is adapted to be attached to a turning plow, gang plow, or disk plow, and so arranged that it harrows the ground twice during the process of plowing.

My improvements comprehend a main beam constructed and mounted in a bearing carried by the plow beam, in a novel manner; a harrow-carrying frame jointed to the main beam of the attachment, raising and lowering lever mechanism for the harrow frame which is arranged in an improved fashion; and an improved draft rod, as more fully set forth hereinafter and recited in the appended claim.

In the accompanying drawings,—

Figure 1 is a plan view showing the invention applied to an ordinary turning plow;

Fig. 2 is a side elevation; and

Fig. 3 an enlarged detail section on the line 3—3, Fig. 1.

The beam of an ordinary turning plow is shown at 1 and the clevis thereof at 2.

My attachment is self-contained and complete, being adapted to be applied to the beam 1 and clevis 2 of any plow. There is a main beam 3 of piping which has an angular arm 4. A block or casting 5 which is removably secured to the beam by yokes 6, nuts 7 and plates 8, has a bore 9 which is circular in cross section. The bent arm 4 of the beam 3 is received within the bore 9 and adapted to turn therein. To prevent the arm 4 from pulling out of the casting or block 5 a cotter 10 is passed through a hole in the rear end of the arm.

The yokes 6 are provided with upper and lower portions which bear upon the upper and lower faces of the plow beam 1 and an arched part 11 which conforms to the curvature of the block or casting 5. The yokes are thus adapted to firmly hold the casting against the side of the beam 1 and yet by simply removing the nuts 7, the attachment may be taken off the plow.

The harrow frame 12 may be of angle iron for purposes of strength and it is of U-shape, the forward ends of its arms being jointed at 13 to clips 14 tightly yet slidably fastened on the beam 3. This arrangement enables the frame 12 to be raised or lowered as desired and also to be shifted along the length of the beam 3 to position the harrow teeth 15 as desired in relation to the beam 1. The teeth 15 are of the usual spring type, suitably fastened to the frame 12 by yokes or clips 16.

A toothed segment 17 is secured to the beam 3 by a clip 18, enabling it to be moved to any point of the length of the beam 3, according to the point where the frame 12 is set. A lever 18′ which is pivoted to the segment 17 at 19, is operatively connected to the frame 12 at 20 by a rod or bar 21. Suitable latching means 22 is provided for the lever 18′ to engage the segment 17. Means are thus provided whereby the harrow frame 12 may be raised or lowered and set at any desired position to cause the spring teeth 15 to enter to any desired depth in the earth.

It will be understood that the rockable mounting of the bent arm 4 in the casting 5 enables the harrow attachment to rise or fall, according to the condition of the ground; a runner or wheel 23 is carried by the outer end of the beam 3 and supports the attachment.

A draft rod 24 is connected at its forward end 25 to the clevis 2 in a detachable fashion; its rear end passes loosely through an eye-bolt 26 secured to the beam 3. A nut 27, carried by the rod 24, engages the eye-bolt 26. The draft rod 24 may be made in sections which are relatively slidable and provided with an interposed expansible coil spring 28 which takes up shocks but is of sufficient stiffness to afford the requisite draft.

Having thus described my invention, what

I claim as new, and desire to secure by Letters Patent, is:—

A harrow attachment for plows comprising a main beam adapted for attachment to the plow, a harrow frame hinged to the said beam by connections which permit it to be set at different points of the length of the said beam, harrow teeth carried by the frame, means for raising, lowering and setting the harrow frame, said means being carried by the beam and adjustable along the same according to the position where the frame is to be set, and harrow teeth carried by said frame.

In testimony whereof I hereunto affix my signature.

WILLARD E. SHEPARD.

Copies of this patent may be obtained for five cents each, by addressing the "Commissioner of Patents, Washington, D. C."